Figure 1:
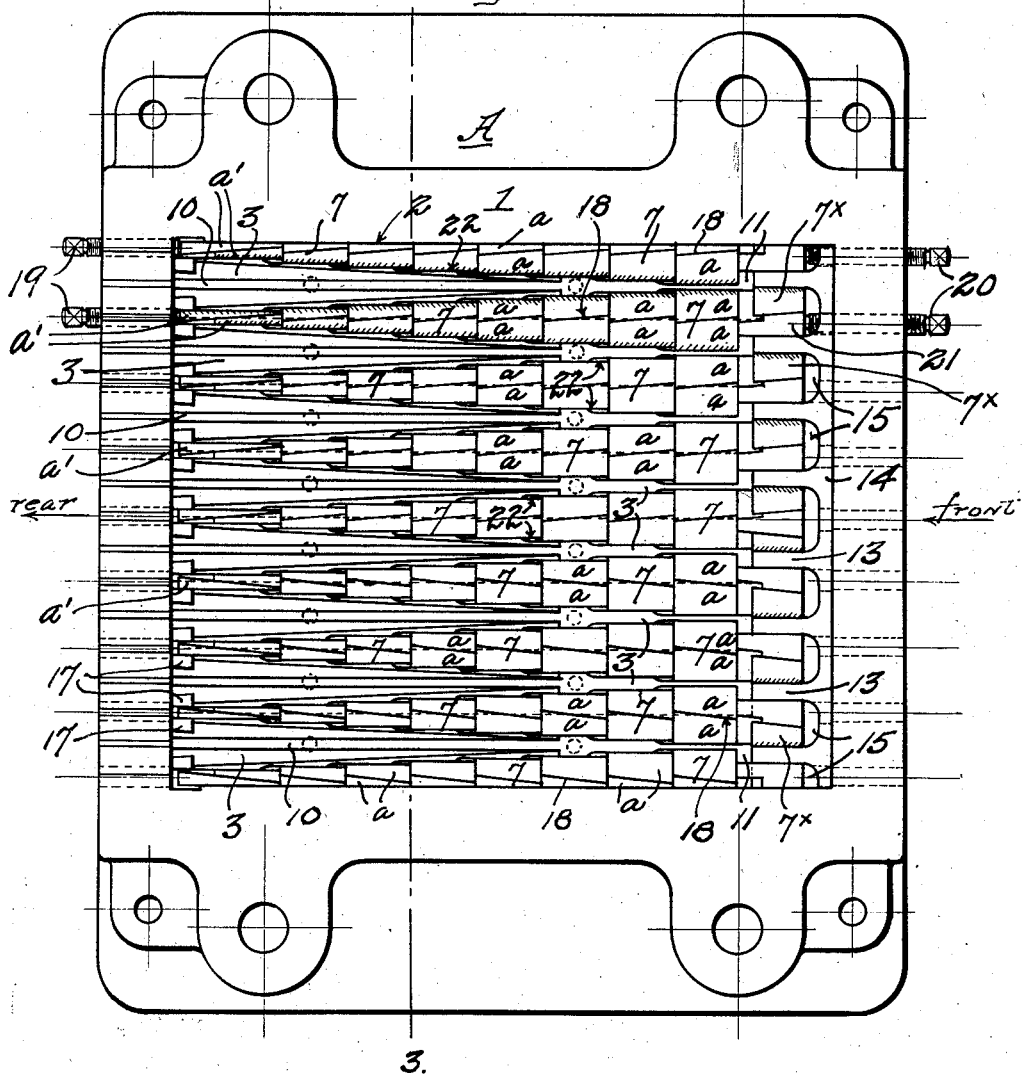

H. E. WHITE.
SHEET METAL SLITTING AND PUNCHING MACHINE.
APPLICATION FILED FEB. 13, 1912.

1,049,632.

Patented Jan. 7, 1913.

9 SHEETS—SHEET 1.

WITNESSES:

H. E. WHITE, INVENTOR

BY

ATTORNEY

H. E. WHITE.
SHEET METAL SLITTING AND PUNCHING MACHINE.
APPLICATION FILED FEB. 13, 1912.

1,049,632.

Patented Jan. 7, 1913.
9 SHEETS—SHEET 2.

WITNESSES:
A.C. Stewart
Agnes A. Johnston.

H. E. WHITE, INVENTOR

BY
W.T. Carman, ATTORNEY

H. E. WHITE.
SHEET METAL SLITTING AND PUNCHING MACHINE.
APPLICATION FILED FEB. 13, 1912.

1,049,632.

Patented Jan. 7, 1913.

9 SHEETS—SHEET 3.

WITNESSES:

H. E. WHITE, INVENTOR

BY

ATTORNEY

H. E. WHITE.
SHEET METAL SLITTING AND PUNCHING MACHINE.
APPLICATION FILED FEB. 13, 1912.

1,049,632.

Patented Jan. 7, 1913.
9 SHEETS—SHEET 4.

WITNESSES:

H. E. WHITE, INVENTOR

BY
ATTORNEY

H. E. WHITE.
SHEET METAL SLITTING AND PUNCHING MACHINE.
APPLICATION FILED FEB. 13, 1912.

1,049,632.

Patented Jan. 7, 1913.

9 SHEETS—SHEET 5.

WITNESSES:
A.C. Stewart
Agnes A. Johnston.

H. E. WHITE, INVENTOR

BY
W.C. Carman
ATTORNEY

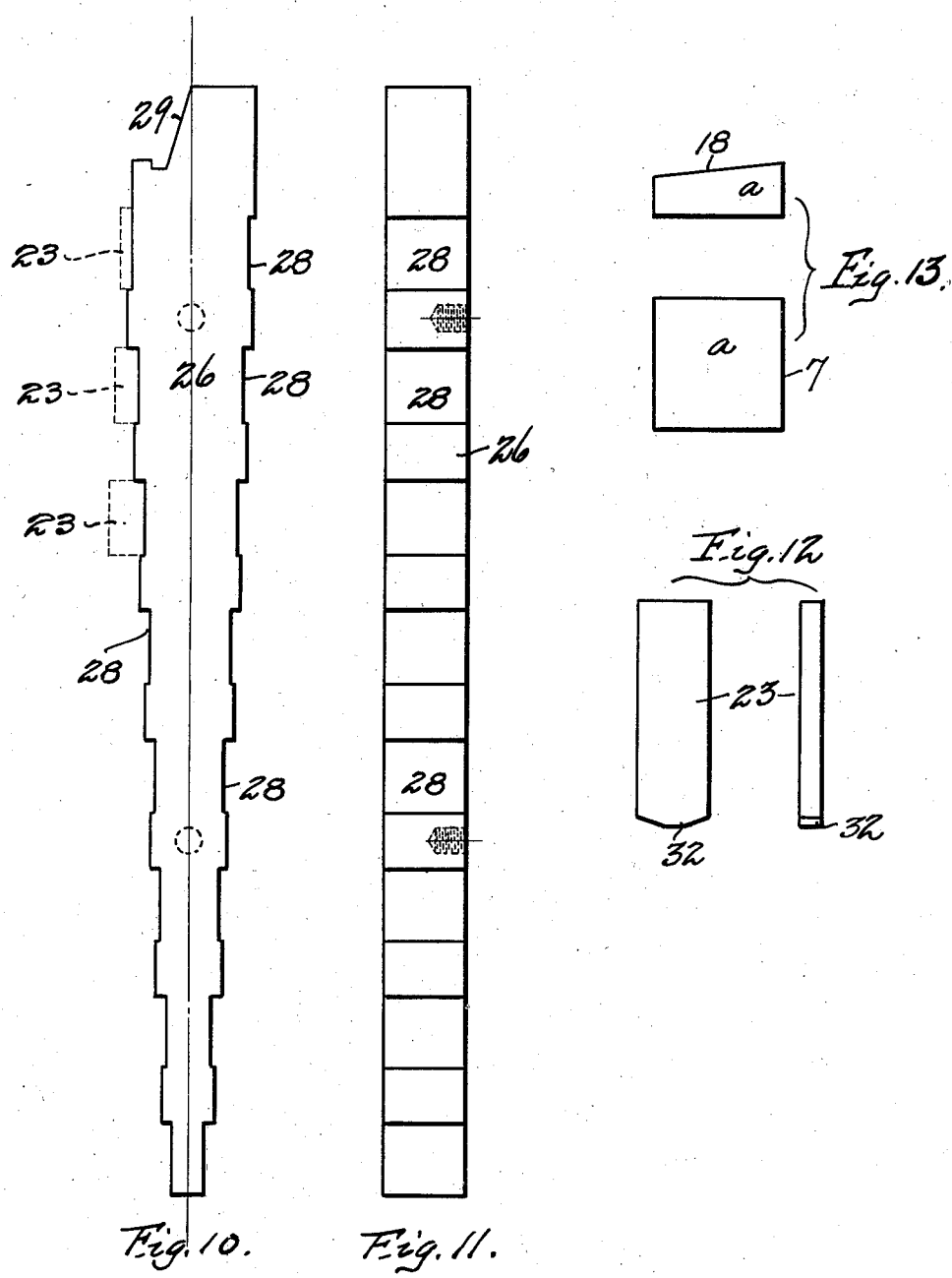

H. E. WHITE.
SHEET METAL SLITTING AND PUNCHING MACHINE.
APPLICATION FILED FEB. 13, 1912.
1,049,632.
Patented Jan. 7, 1913.
9 SHEETS—SHEET 7.
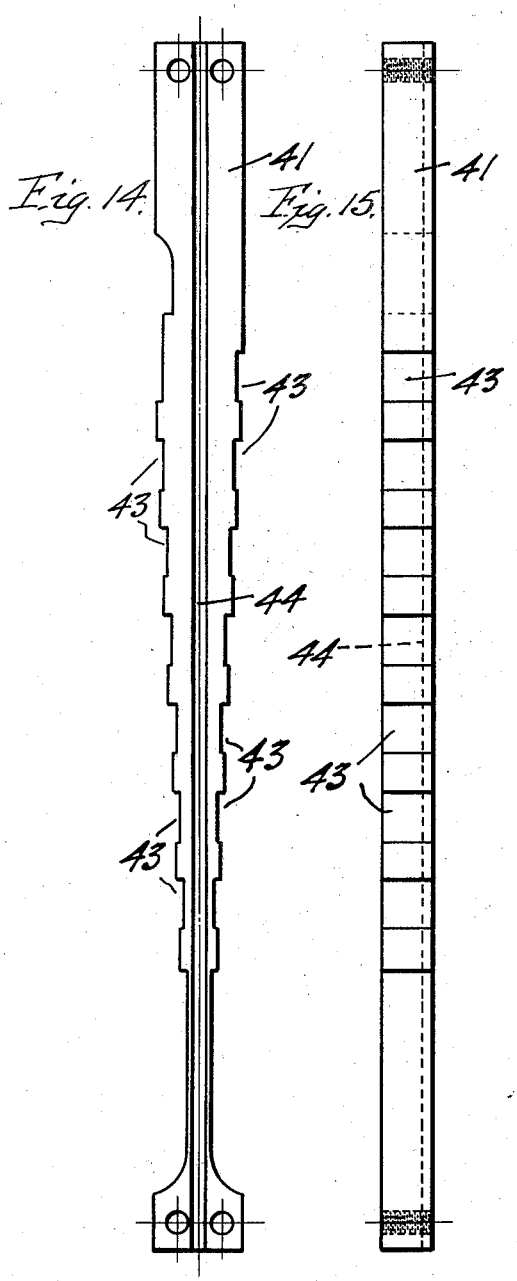
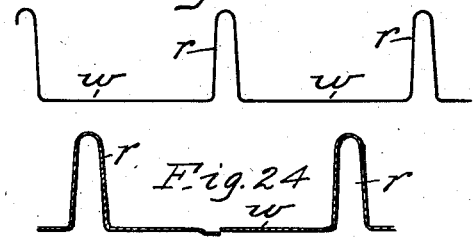
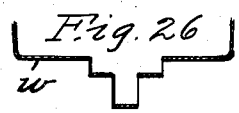
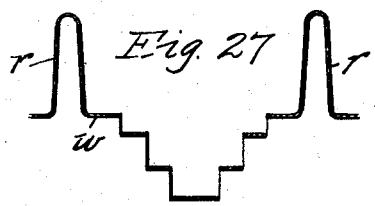
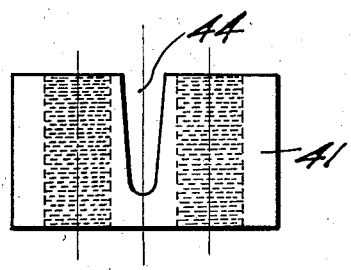
WITNESSES:
A.C. Stewart
Agnes A. Johnston.
H. E. WHITE, INVENTOR
BY
W. C. Carman, ATTORNEY

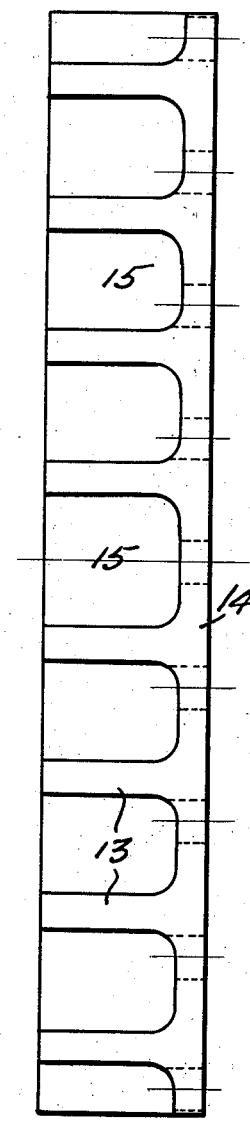
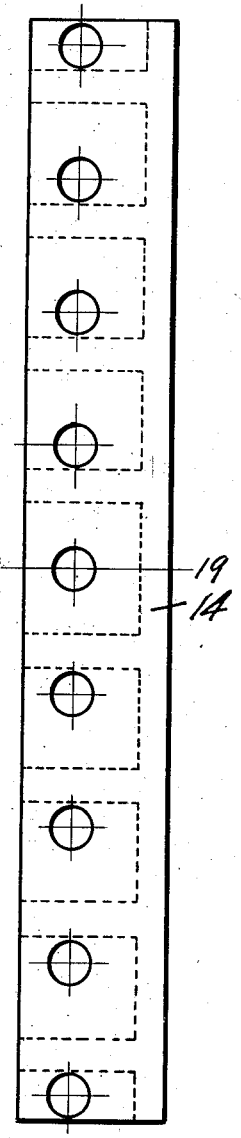
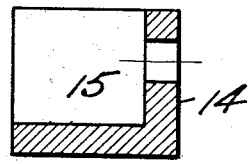

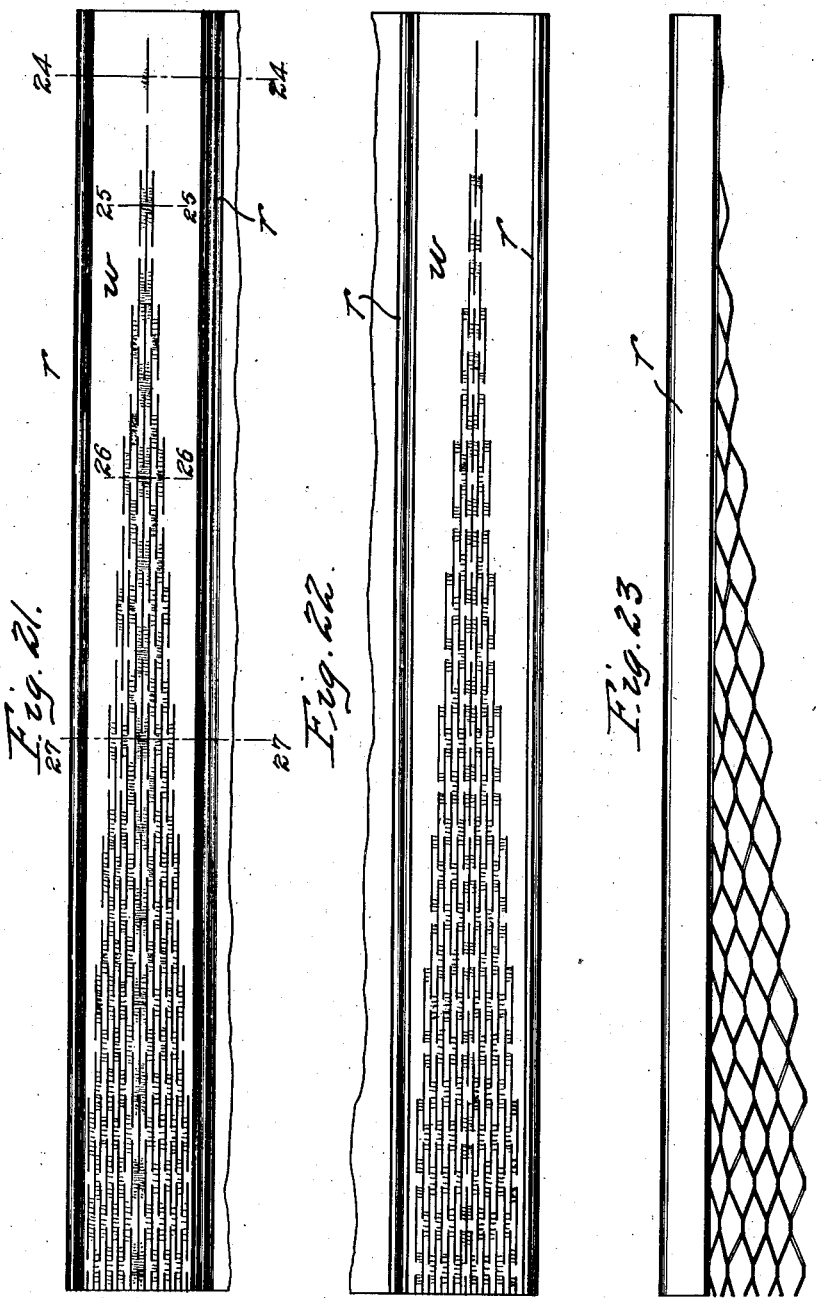

UNITED STATES PATENT OFFICE.

HERBERT E. WHITE, OF YOUNGSTOWN, OHIO, ASSIGNOR TO THE GENERAL FIRE-PROOFING COMPANY, OF YOUNGSTOWN, OHIO, A CORPORATION OF OHIO.

SHEET-METAL SLITTING AND PUNCHING MACHINE.

1,049,632. Specification of Letters Patent. Patented Jan. 7, 1913.

Application filed February 13, 1912. Serial No. 677,361.

*To all whom it may concern:*

Be it known that I, HERBERT E. WHITE, a citizen of the United States, residing at Youngstown, in the county of Mahoning and State of Ohio, have invented certain new and useful Improvements in Sheet-Metal Slitting and Punching Machines, of which the following is a specification.

This invention relates to the subject of expanded sheet-metal products, such as now widely employed in reinforced concrete structures for building and other purposes, and has particular reference to novel and practical means for slitting and punching the metal sheet after it has been preliminarily stiffened and grooved by means such as disclosed in the related application filed February 13, 1912, Serial Number 677,373, thus providing for the preparation of the sheet for a subsequent operation of expanding in a suitable expanding machine, as of the type disclosed in my other related application filed September 8, 1911, Serial Number 648,384.
To this end the invention contemplates a construction of sheet-metal slitting and punching machine possessing special advantages in performing its part of the process of developing and producing that type of expanded sheet-metal product known on the market as the ribbed diamond lath. In this connection the invention has specially in view a novel arrangement of cutting and shearing dies that provide for the gradual and progressive development of the necessary slits and upsetting of the metal for producing between the stiffening ribs of the sheet the primary form of the expanded diamond mesh, which is subsequently straightened out laterally and further expanded by the action of the expanding machine.

Furthermore, the present invention provides a construction and arrangement of cooperating cutting dies and shearing dies which have the effect of not only slitting the metal longitudinally and punching out or displacing the angular or V-strands of the diamond mesh, but also have the effect of elongating the individual strands of the mesh with the result of securing a preliminary expansion or extension of the metal in the individual strands, which result, in the aggregate, makes this operation an appreciable and practical factor in the ultimate expanded area of the metal sheet.

Another important object of the invention is to provide a slitting and punching machine wherein the individual cutting dies, or die units, not only have a slitting operation, but at the time of cutting or slitting also displace or offset the individual V-strands being formed, as well as those previously formed.

A further object of the invention is to provide in a machine of the class described a construction which not only preserves the novel and peculiar relation of the cutting and shearing dies, respectively, of the punch and anvil members of the machine, but also secures a mounting for these dies that permits of individual removal and replacement thereof, as well as permitting reversal of the dies, or at least certain of them, when the cutting edges at one corner become worn.

Other important and practical objects will readily appear to those skilled in this art as the nature of the invention is better understood, the said invention consisting in the novel construction, combination and arrangement of parts hereinafter more fully described, illustrated and claimed.

The essential features of the invention, involved in carrying out the objects above indicated, are necessarily susceptible to a wide range of structural modification without departing from the spirit or sacrificing any of the advantages of the invention, but a preferred and practical embodiment thereof is shown in the accompanying drawings, in which—

Figure 2:
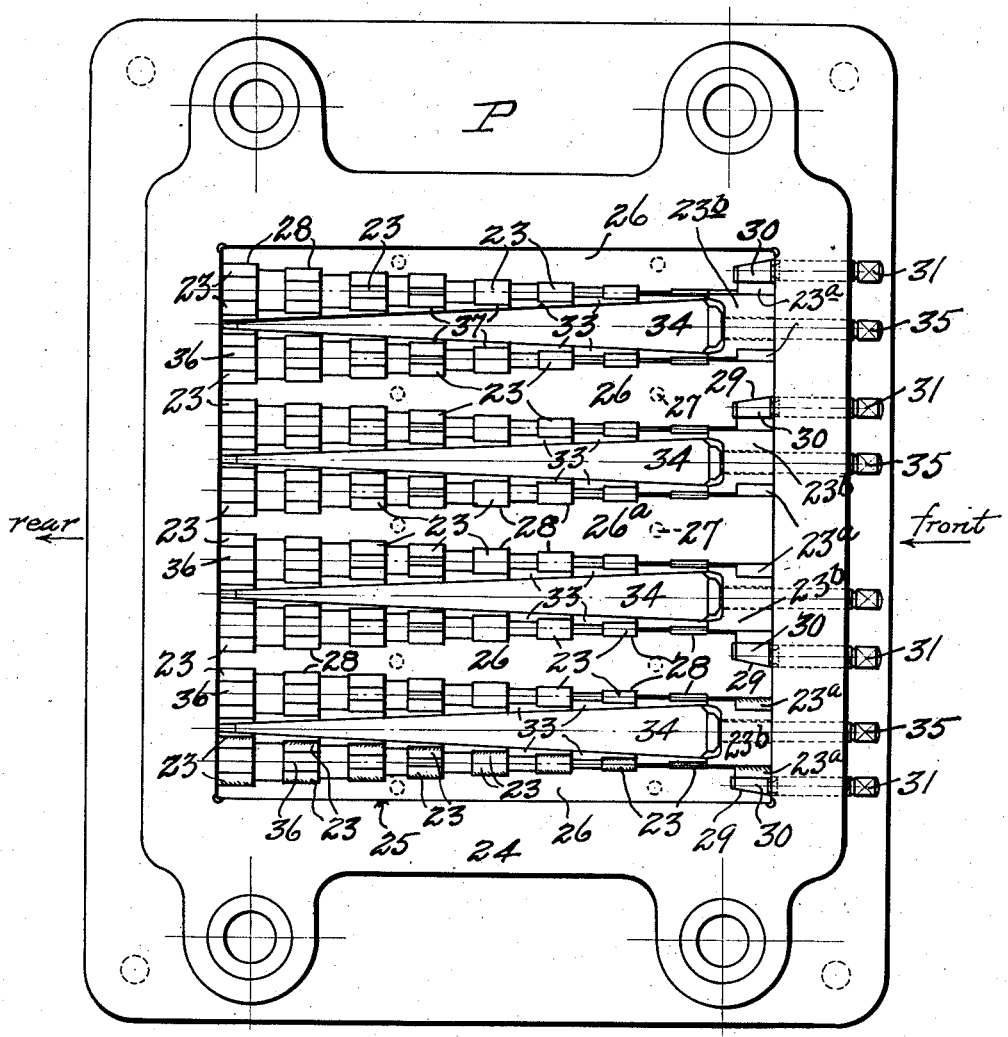
Figure 3:
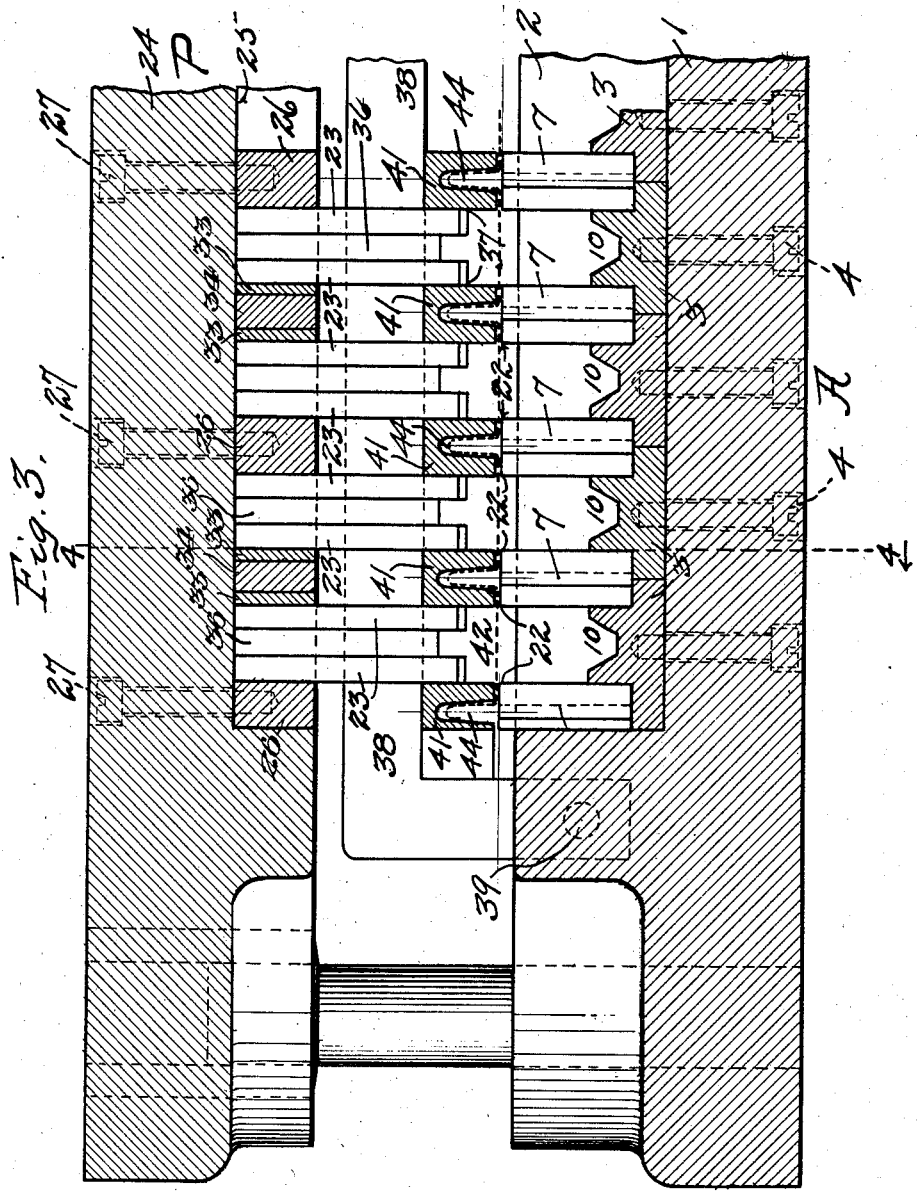
Figure 4:
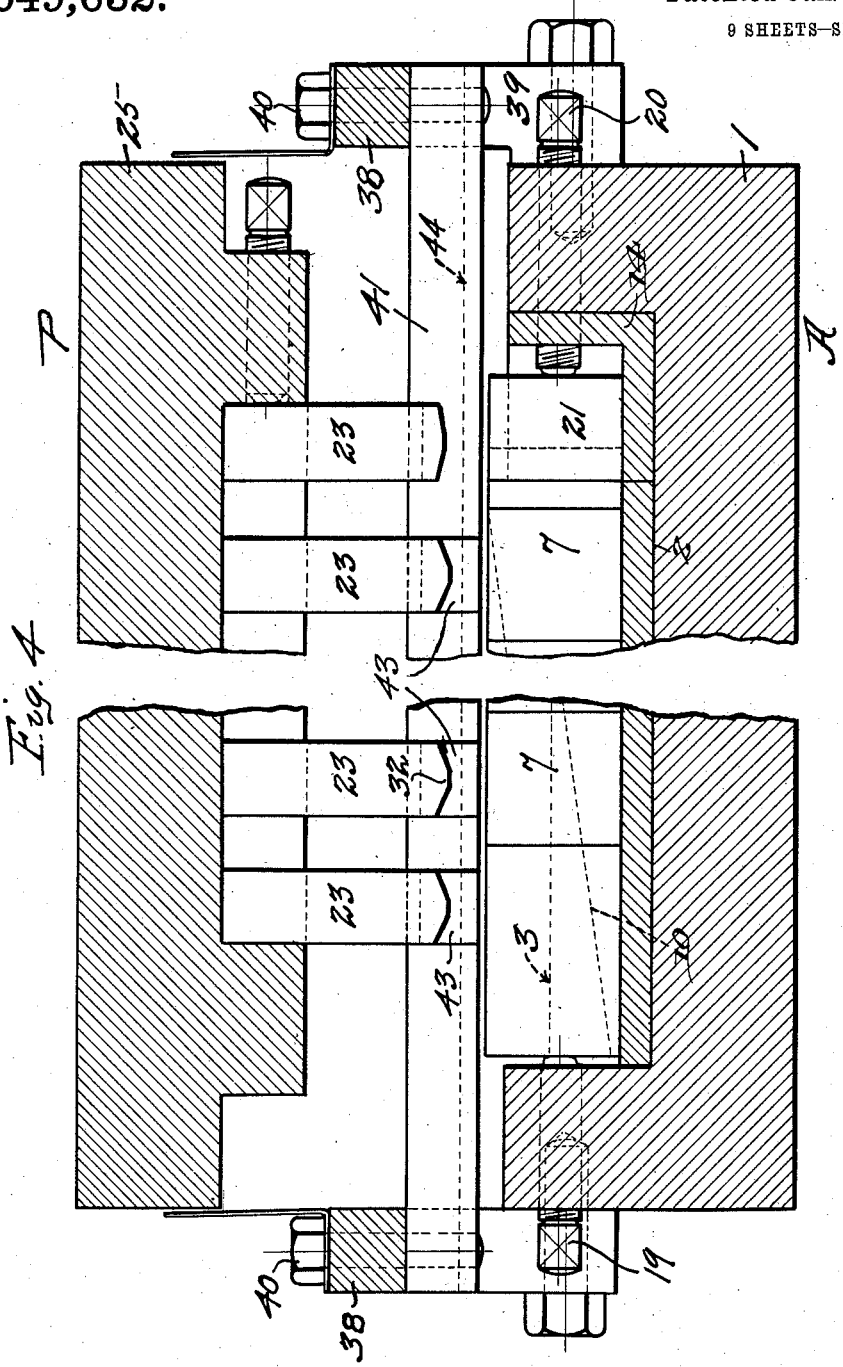
Figures 5, 6:
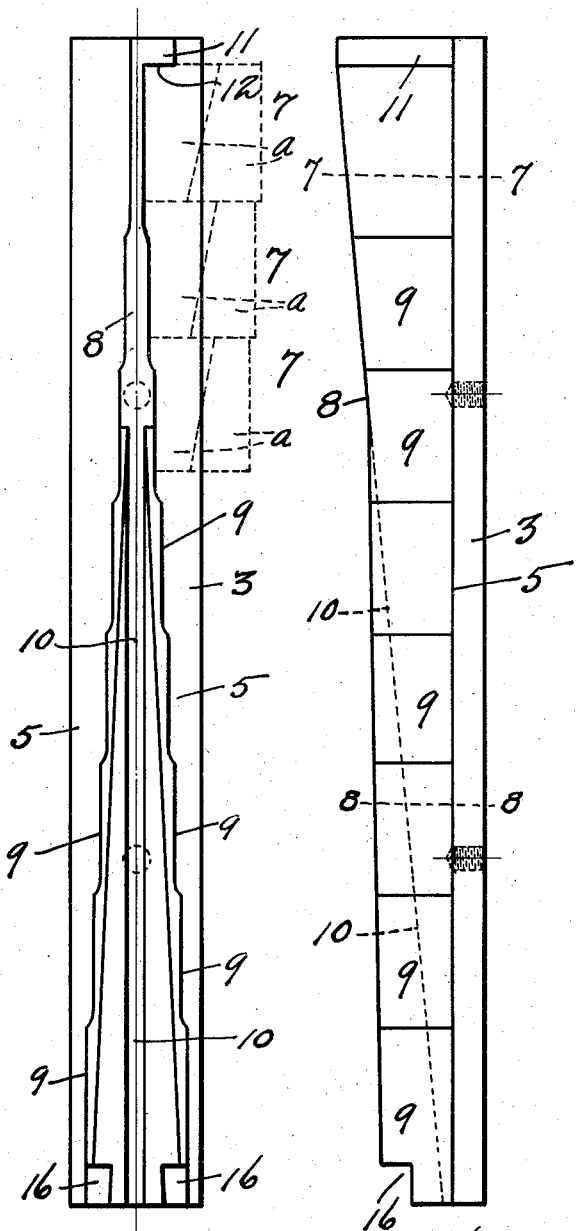
Figure 7:
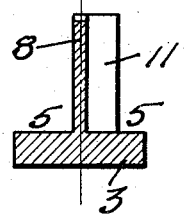
Figure 8:
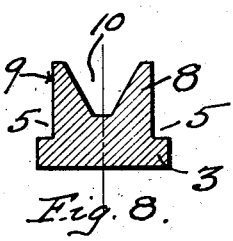
Figure 9:
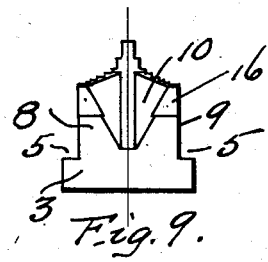

Figure 1 is a plan view of the lower or anvil member of the machine. Fig. 2 is a similar view of the complemental upper punch member that coöperates with the die elements of the anvil member to secure the results above referred to. Fig. 3 is a transverse sectional view of the assembled machine on the line of section 3—3 of Fig. 1, said Fig. 3 showing both the upper and lower members of the machine, as well as the work guide and stripper that operates as a guide for the sheet as it is fed through the machine, as well as serving to strip the work from the ascending cutters. Fig. 4 is a vertical longitudinal sectional view on the line 4—4 of Fig. 3. Figs. 5 and 6 are plan and side elevational views, respectively, of the novel form of seating bar for the shearing dies or blocks of the anvil member. Figs. 7 and 8 are cross-sectional views of the said die-seating bar, respectively, on the lines 7—7 and 8—8 of Fig. 6. Fig. 9 is an end view of the said die-seating bar shown in Figs. 5 and 6. Figs. 10 and 11 are plan and side elevational views, respectively, of the cutter seating bar that is employed for the positioning and seating of the individual cutter bars or die units which are assembled and grouped in the upper punch member. Fig. 12 is a side elevation and projected edge view of one of the individual cutter elements or dies of the upper punch member. Fig. 13 is a similar view of one of the shearing blocks or dies of the lower anvil member. Figs. 14 and 15 are plan and side elevational views, respectively, of one of the guiding stripper bars of the combined work guide and stripper. Fig. 16 is an end view of the stripper bar. Figs. 17 and 18 are plan and side elevational views, respectively, of the end fastening frame associated with the locking means for the shearing blocks or dies of the lower anvil member. Fig. 19 is a detail cross-sectional view on the line 19—19 of Fig. 18. Fig. 20 is a cross-sectional view of the preliminarily stiffened and grooved sheet-metal blank that is fed to the present machine to be slitted and upset thereby. Fig. 21 is a top plan view of a section of the sheet illustrating the progressive development of the slitting and upsetting operations for producing the primary form of the expanded diamond mesh. Fig. 22 is a bottom plan view of the same section of metal. Fig. 23 is a side view thereof. Fig. 24 is a cross-sectional view on the line 24—24 of Fig. 21 showing the effect of the first cutter element and the slight upsetting of the metal. Figs. 25, 26 and 27 are cross-sectional views on the lines 25—25, 26—26, and 27—27 of Fig. 21, illustrating the progressive development and deepening of the V-shaped arch (diamond meshed) between the stiffening ribs of the sheet, which result is produced by the peculiar arrangement of the cutters and shearing blocks of the punch and anvil members of the machine.

Like references designate corresponding parts in the several figures of the drawings.

The improved machine includes in its general organization what has been termed an upper punch member designated in its entirety by the letter P, and a lower anvil member designated in its entirety by the letter A, said members constituting in effect complemental dies or die members that may be conveniently used in an ordinary die press, or similar machine, wherein the anvil member will constitute the stationary part of the die, and the punch member will form the vertically movable part of the machine which is reciprocated in the ordinary manner. Also it will be understood that since the punch and anvil members of the present machine may be employed in the same manner as dies in a die-press, any well known feeding means or other accessories may be employed to facilitate the handling of the metal-sheet that is being operated upon. Hence, for illustrative purposes the punch and anvil members of the machine are simply shown in the drawings disassociated from any particular kind of die-press or punch.

Referring particularly to the stationary part of the machine which is characterized as a lower anvil member that acts as a complemental die for the upper punch member, it will be observed from the drawings that the said anvil member includes a recessed base, 1, the upper side of which is channeled out as indicated at 2 to form a die recess in which are assembled the various elements which form the lower die. Arranged within this recess are a series of longitudinally disposed die-seating bars 3, which provide for the positioning and seating of the individual shearing blocks or dies to be presently referred to. The die-seating bars 3 are arranged in side by side relation, extending the full length of the base 1 from the front to the rear of the recess 2 therein, and may be suitably secured rigidly in place by means of fastening screws 4, or equivalent fastening devices mounted in the body of the base 1 and engaging the bars 3.

Each of the die-seating bars 3 is rabbeted at its opposite upper corners, as indicated at 5, which rabbeted portions register with the corresponding rabbeted portions of the adjacent bars to provide holding seats that receive and hold in position the shearing blocks or dies 7, which act as the lower cutting elements of the machine. In connection with the rabbeted construction of the individual bars 3, the same are of the novel configuration shown in Figs. 5 and 6 of the drawings, that is to say, the upstanding rib or body part 8 of each seating bar 3 is formed upon both sides thereof with a stepped series of abutment faces 9, against which are rigidly clamped and secured the shearing blocks 7, and by reason of the stepped formation of the faces or shoulders 9, the upstanding rib or body part 8 of each die-seating bar is of a tapering width from the rear to the front of the machine, as plainly shown in Figs. 1 and 5 of the drawings. Another feature of construction that is peculiar to each of the bars 3 is that of forming the same, in the top of its rib 8, with an approximately cross-sectionally V-shaped clearance and guiding groove 10 that is of a tapering depth toward the front end of the machine. In other words, the said groove 10 in the top of each die-seating bar 3 gradually deepens toward the rear end or side of the machine to accommodate and guide the tapering V-shaped arch of the sheet-metal blank, which arch is plainly shown in Figs. 23, 25, 26 and 27 of the drawings. A further mechanical detail of each of the seating bars 3 is that of forming at one end of the upstanding rib part 8 an angularly disposed foot lug 11 that provides an inside shoulder 12, and also abuts at its outer side, which is the front end of the said bar, against the edge of one of the walls 13 of an end-fastening frame 14. This fastening frame 14 is seated at one end of the die-recess 2, and is approximately L-shaped in cross-section, as shown in Fig. 19, and is formed with a plurality of keeper sockets 15 separated by the walls 13, said keeper sockets accommodating the foremost shearing blocks 7 at the front side of the machine and also certain of the locking elements for clamping the movable parts in position. At the end opposite the lug 11 each of the bars is preferably formed with notches 16 that engage complemental retaining projections 17 at the rear side of the base, all of which contribute to the necessary rigidity of the seating bars as holding means and abutments for the shearing blocks or dies 7.

Referring particularly to Fig. 1 of the drawings, the construction and arrangement of the shearing blocks 7 may be best observed. A longitudinal series of these blocks is arranged between the opposing faces 9 of each pair of the seating bars 3. In other words, between every two die-seating bars 3 there is formed a longitudinally tapering holding seat which is filled by the shearing blocks 7, and these shearing blocks are preferably of a divided or two-part construction, the same consisting of duplicate block members, a, which block members a are provided with the inclined wedge faces 18. The sides of the block members a opposite their wedge-faces 18 flatly abut against the abutment faces 9 of the seating bars between which they are arranged, (see Fig. 5) and said abutment faces 9 are sufficiently long to accommodate any longitudinal movement of the die-block members incident to their assembly and clamping in position. Each terminal pair of block members a', a', at the rear side of the machine (see Fig. 1) constitute setting wedges for the entire line of similar shearing blocks associated therewith, as it will be observed that one of the said rear terminal pair of block members is longer than the other and has associated therewith a setting screw 19 mounted in the rear side of the base 1 and engaging said longer block member so that the tightening up of the screw exerts a wedging and crowding action throughout the line or series of shearing blocks. A fastening screw 20, mounted at the front side of the anvil-base, engages a locking wedge 21 mounted in one of the keeper sockets 15 of the fastening frame 14. This locking wedge may engage one of the front terminal paired shearing block members a, and also laterally engages a single shearing block member 7$^x$, which is arranged in the said keeper socket of the fastening frame. It will thus be seen that secure means are provided for very tightly wedging and locking the sectional or two-part shearing blocks in place within the holding seats therefor, while at the same time permitting the ready removal and replacing or reversing of any individual blocks. At the side margins of the die-seat within which the seating bars 3 and the die-blocks are arranged, the outer sections a of the marginal series of shearing blocks bind directly against the side walls of the recess 2, as may be plainly seen from Figs. 1 and 3 of the drawings.

A shearing or cutting action is effected by the shearing blocks or dies at their upper corners, as indicated at 22 in Fig. 3 of the drawings, and which corner cutting edges are indicated by shade lines on a couple of rows of the shearing blocks shown in Fig. 1 of the drawing.

In a similar manner to the assembling and fastening of the shearing blocks 7 in position in the lower stationary anvil member the cutter elements or dies 23 for the upper punch member are assembled and secured. (See Fig. 2). Describing the same, it will be observed from Fig. 3 of the drawings, that the upper punch member P includes a supporting body 24 having formed in its under side a die recess 25, corresponding to the die recess 2 of the anvil base 1. Within this die recess 25 there are arranged a longitudinal series of cutter-seating bars 26, and which may be conveniently secured in position by means of machine screws or equivalent fastening devices 27.

The bars 26 are arranged in regular spaced relation, and taper in width from the front to the rear side of the machine. Each of the said bars is provided along the inclining sides thereof with a stepped series of shouldered cutter-seats 28, (see Fig. 10) in which the individual cutter elements or dies 23 are clamped, and at its wider end the body of each seating bar 26 is provided with an inclined bearing face 29 against which is adapted to bear an adjustment wedge 30 which is moved in a longitudinal direction under the influence of a thrust-screw 31. The function of this thrust-screw, in combination with the wedge 30 and bearing face 29 is to lock in place the set of front terminal cutters 23$^a$. Spacer blocks 23$^b$ are interposed between each pair of the terminal cutters 23$^a$ to maintain their proper spaced relations.

At the side margins of the die recess 25 the cutter-seating bars are longitudinally bisected, being in all other respects the same as the remaining bars 26 as to the stepped shouldered seats 28 for the positioning and securing of the individual cutter elements or dies 23. These individual elements 23 essentially consist of flat cutting blades, the cutting ends 32 of which are slightly crowned, as plainly shown in Fig. 12 of the drawings, so as not only to slit the metal but also to penetrate the same and provide for offsetting or pushing out the V-strands of the diamond mesh, as is plainly shown in Fig. 23, and also in Figs. 25, 26 and 27. As to the mounting of the individual cutter elements or dies 23, the same are arranged in pairs upon each side of each cutter-seating bar 26, and are held detachably clamped in the seats 28 of such bar by means of inclined chock-blocks 33, against which are crowded fastening wedges 34, arranged longitudinally in the tapering spaces between the seating bars 26 and having associated with their wide front ends the adjusting screws 35 mounted at the front side of the body 24 of the punch member. It will thus be seen that the tightening of the wedges 34 serves to crowd the chock-blocks 33 against the cutting units, which in turn are interlocked with the seats 28 of the cutter seating bars.

The term "cutter units" has been applied to the paired cutting blades 23, the cutters of each pair being preferably held in properly spaced relation by means of filler plates 36 interposed therebetween, as is best shown in Fig. 3 of the drawings. It will be observed, however, while this construction prevails in most of the cutter units throughout the upper punch member, those cutter units nearest the front or feeding-in side of the machine consist of two blades placed side by side, as clearly shown in Fig. 2 of the drawings. The cutting action is effected by the cutter elements 23 at their outer corner edges, as indicated at 37 in Fig. 3, which outer corner edges coöperate with the corresponding edges 22 of the shearing blocks, but it will be observed that both of the lower corner edges of the cutter elements 23 are cutting edges, so that the cutter elements may be reversed as well as removed and replaced.

Associated with the punch and anvil members above described, is a device that has been herein termed a combined work guide and stripper, which may be readily understood by an inspection of Figs. 3, 4, 14, 15, and 16 of the drawings. This combined work-guide and stripper includes in its organization the oppositely arranged supporting bars 38, supported as at 39 at the opposite front and rear sides of the anvil-base 1, and having suitably fastened thereto by the screw-bolts or equivalent elements 40 the front and rear ends, respectively, of a longitudinal series of guiding stripper bars 41. These stripper bars 41 overlie the base 1 in parallelism thereto, and are arranged parallel to each other, in spaced relation, to form therebetween guideways 42 (see Fig. 3) through which operate the cutting units. Hence, the said guiding stripper bars 41 alternate with the longitudinal rows of cutting units, and each of said bars is of a longitudinally tapering shape and is provided on both sides thereof with a stepped series of shouldered guide notches 43, that are slidably engaged by the cutter elements 23 and consequently serve in the capacity of bracing bearings for the moving cutters, the bars at the same time performing the function of stripping the work from the ascending cutters. Each of the said guiding stripper bars 41 is provided in its under side with a longitudinal guide groove 44 that slidably receives and guides the upstanding stiffening ribs of the metal sheet.

As herein indicated, the preliminarily stiffened and grooved metal sheet is fed to the machine with the upstanding ribs $r$ thereof slidably engaging in the guide grooves of the stripper bars, and the intermediate or straight web portions $w$ lying in the path of the cutting units carried by the punch member, and as these cutting units are graduated in arrangement as indicated by the illustration in Fig. 2 of the drawings, it will be understood that provision is made for the progressive development and deepening of the V-shaped, diamond-meshed, arch between the said stiffening ribs of the sheet. By reason of the fact that the shearing blocks, which may be termed "shearing units", of the anvil member are progressively graduated in width so as to provide progressively tapering rows of such units, and the cutting units are correspondingly tapered and arranged in rows, not only is there a progressive development and deepening of the V-shaped meshed arch between the stiffening ribs of the sheet, but there is also provided an action wherein this arch is gradually, step-by-step, progressively widened at its point of juncture with the uncut portions of the sheet web $w$, as may be plainly seen from Fig. 21 of the drawing. Starting from a single slit in the web of the sheet, as indicated at the line 24—24 on Fig. 21, and as shown in Fig. 24 of the drawings, the succeeding cutter and shearing units provide other and wider apart slits and at the same time cause a punching down or offsetting of the individual V-strands $v$ of the mesh, as will be readily understood from Fig. 21 of the drawings and the sections taken on that figure at the lines 25—25 and 26—26, and 27—27. This peculiar operation is rendered possible only by the novel and peculiar arrangement of the cutter units and of the shearing units, as well as the other mechanical features, such as the clearance and guiding grooves 10, in the die-seating bars, and the groove formation of the guiding stripper bars, all of which contribute to prepare the sheet in its best possible form for being subsequently straightened out or expanded laterally by the action of an expanding machine, such as the one disclosed in my application aforesaid.

I claim,—

1. In a machine of the class described, an anvil-member having a series of rows of shearing units, each of which rows gradually tapers in width toward the rear of the machine, and a punch-member having similar rows of cutter units, each of which rows tapers in width toward the front of the machine.

2. In a machine of the class described, an anvil-member having tapering rows of progressively graduated shearing units providing rearwardly flaring spaces between the rows, and a punch member having similar rows of cutter units operating in said spaces.

3. In a machine of the class described, an anvil-member having tapering rows of progressively graduated shearing units providing rearwardly flaring spaces therebetween, which spaces are also of tapering depth toward the rear of the machine, and a punch member having similar rows of cutter units having a reverse taper to that of the rows of shearing units and operating in said spaces.

4. In a machine of the class described, an anvil-member having tapering rows of progressively graduated shearing units, a punch-member having similar rows of cutter units, and a work guide and stripper arranged between said two members and having stripper bars arranged to form tapering guideways therebetween for the cutter unit.

5. In a machine of the class described, an anvil-member having tapering rows of progressively graduated shearing units, a punch-member having similar rows of cutter units, and a stationary work-guide and stripper, including longitudinally grooved stripper bars for receiving and guiding the ribbed metal sheet, said stripper bars being also arranged to provide tapering guideways therebetween for the cutter units.

6. In a machine of the class described, an anvil-member having tapering rows of progressively graduated shearing units providing rearwardly flaring spaces therebetween, a punch-member having similar rows of forwardly tapering cutter units operating in the spaces between the shearing units, and a work-guide and stripper including stripper bars arranged to provide tapering guideways therebetween for the cutter units.

7. In a machine of the class described, an anvil-member including a base, a series of longitudinal die-seating bars fitted to the base and provided upon both sides thereof with stepped series of abutment faces, and shearing units clamped between said bars against said abutment faces, and a punch-member having cutter units.

8. In a machine of the class described, an anvil-member including a base, a series of longitudinal die-seating bars fitted to the base and provided upon both sides thereof with a stepped series of abutment faces, and tapering rows of progressively graduated shearing units secured in the tapering spaces between the bars and held clamped against the abutment faces thereof, and a punch-member having cutter units.

9. In a machine of the class described, an anvil-member including a base, a series of die-seating bars provided upon both sides thereof with a stepped series of abutment faces, and tapering rows of wedging shearing units clamped between said bars against said abutment faces, and a punch-member having cutter units.

10. In a machine of the class described, an anvil-member including a base, a series of longitudinal die-seating bars tapering forwardly, and tapering rows of graduated shearing units removably clamped in the tapering spaces between said bars and against the latter.

11. In a machine of the class described, an anvil-member including a base, a series of forwardly tapering longitudinal die-seating bars, and tapering rows of progressively graduated wedging shearing units clamped in the tapering spaces between said bars, and a punch-member having cutter units.

12. In a machine of the class described, an anvil-member including a base, a series of die-seating bars arranged upon the base to provide tapering spaces therebetween, and tapering rows of graduated shearing units clamped between and against said bars, said units being of a two-part construction with wedging faces between the sections, and a punch-member having cutter units.

13. In a machine of the class described, an anvil-member including a base, a series of die-seating bars arranged upon the base to provide tapering spaces therebetween, tapering rows of sectional wedging shearing units clamped between and against the said bars, screw-adjusting means associated with the front and rear terminal sets of said units for adjusting and clamping them in position, and a punching member having cutter units.

14. In a machine of the class described, an anvil-member including a base, a series of die-seating bars arranged upon the base, an end-fastening frame arranged at one end of the base and having a plurality of keeper sockets, sectional wedging shearing units clamped between and against the said bars, a setting screw coöperating with one terminal set of said units in each row, a screw-adjusted locking wedge coöperating with one of the sections of the other terminal units of this row, and a single shearing unit clamped in each of said keeper sockets by said wedge, and a punching member having cutter units.

15. In a machine of the class described, an anvil-member having shearing units, and a punch-member including a supporting body, a series of cutter-seating bars arranged to provide tapering spaces therebetween, and tapering rows of graduated cutter units removably clamped against said bars.

16. In a machine of the class described, an anvil-member having shearing units, and a punch-member having a supporting body, a series of longitudinal rearwardly tapering cutter-seating bars provided upon both sides thereof with a stepped series of shouldered cutter seats, cutter units fitting said seats, and wedging means for clamping the cutter units in position.

17. In a machine of the class described, an anvil-member having shearing units, and a punch member having a supporting body, a series of longitudinal tapering cutter-seating bars, tapering rows of progressively graduated cutter units arranged along both sides of said bars, and wedging means arranged between adjacent rows of the cutter units.

18. In a machine of the class described, an anvil-member having shearing units, and a punch member having a supporting body, a series of longitudinal tapering cutter-seating bars having cutter seats, tapering rows of progressively graduated cutter units arranged along both sides of said bars and engaging the seats thereof, a screw-adjusted wedge arranged between adjacent rows of the cutter unit, and chock-blocks interposed between said wedges and the cutter units.

19. In a machine of the class described, an anvil-member having shearing units, and a punch-member having a supporting body, a plurality of tapering cutter-seating bars, a screw-adjusted wedge-adjustment for one end of said bars, tapering rows of progressively graduated cutter units arranged along both sides of said bars, and screw-adjusted wedge-fastening means operating between and against adjacent rows of the cutter units.

20. In a machine of the class described, an anvil-member having shearing units, and a punch-member having a plurality of tapering rows of progressively graduated cutter units, said units each consisting of single cutter-blades paired to operate between opposing shearing units.

21. In a machine of the class described, an anvil-member including a base, a plurality of die-seating bars fitted to the base and having clearance and guiding grooves of tapering depth, and rows of progressively graduated shearing units clamped between said bars, a punch-member having similarly graduated rows of cutter units operating between the shearing units, and a combined work-holding guide and stripper having a plurality of tapering guiding stripper bars having grooves therein and overlying the shearing units, said stripper bars also having guiding means for the cutter units.

22. In a machine of the class described, an anvil-member having rows of shearing units progressively graduated in width, a punch-member having rows of correspondingly graduated cutter units, and a combined work guide and stripper having tapering guideways for the cutter units.

In testimony whereof I hereunto affix my signature in the presence of two witnesses.

HERBERT E. WHITE.

Witnesses:
 AGNES A. JOHNSTON,
 ALFRED LIEBMAN.